United States Patent
Caruel et al.

(10) Patent No.: US 11,199,158 B2
(45) Date of Patent: Dec. 14, 2021

(54) THRUST REVERSER WITH MOVABLE CASCADES FOR AN AIRCRAFT PROPULSION UNIT AND RELATED MOUNTING AND DISMOUNTING METHODS

(71) Applicant: Safran Nacelles, Gonfreville L'Orcher (FR)

(72) Inventors: Pierre Caruel, Gonfreville L'Orcher (FR); Vincent Peyron, Gonfreville L'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 16/876,704

(22) Filed: May 18, 2020

(65) Prior Publication Data

US 2020/0277916 A1    Sep. 3, 2020

Related U.S. Application Data

(63) Continuation of application No. PCT/FR2018/052852, filed on Nov. 15, 2018.

(30) Foreign Application Priority Data

Nov. 16, 2017  (FR) ...................................... 1760823

(51) Int. Cl.
  *F02K 1/70*  (2006.01)
  *B64D 29/06*  (2006.01)
  *F02K 1/76*  (2006.01)
(52) U.S. Cl.
  CPC ................ *F02K 1/70* (2013.01); *B64D 29/06* (2013.01); *F02K 1/763* (2013.01)

(58) Field of Classification Search
  CPC ........... B64D 29/06; B64D 29/08; F02K 1/70; F02K 1/72; F02K 1/80; F02K 1/763
  See application file for complete search history.

(56) References Cited

U.S. PATENT DOCUMENTS

2010/0107599 A1* 5/2010 Vauchel ................. B64D 29/08
                                                                                                       60/226.2
2016/0169157 A1* 6/2016 Sawyers-Abbott ....... F02K 1/72
                                                                                                          239/1

FOREIGN PATENT DOCUMENTS

FR       2995637       3/2014
FR       2999239       6/2014
(Continued)

OTHER PUBLICATIONS

International Search Report for International Application PCT/FR2018/052852, dated Mar. 14, 2019.

*Primary Examiner* — Andrew H Nguyen
(74) *Attorney, Agent, or Firm* — Burris Law, PLLC (57) ABSTRACT

An aircraft propulsion assembly with an engine provided with a cascade-type thrust reverser includes cascades of mobile deflection vanes connected to cascade rails with a slideway connection that allows the cascades of vanes a translational movement between a cruising-flight position and a reverse-thrust position. The thrust reverser allows the cascade rails to be positioned in a forward position, in which the engine, the cascade rails and the deflection vanes can be removed from the propulsion assembly without the cascade rails colliding with the mobile cowl of the reverser. Dismantling and assembly or reassembly methods allow maintenance operations to be carried out on the engine thus dismantled.

8 Claims, 7 Drawing Sheets

(56) References Cited

FOREIGN PATENT DOCUMENTS

| | | |
|---|---|---|
| FR | 3031726 | 7/2016 |
| FR | 3031728 | 7/2016 |

* cited by examiner

THRUST REVERSER WITH MOVABLE CASCADES FOR AN AIRCRAFT PROPULSION UNIT AND RELATED MOUNTING AND DISMOUNTING METHODS

CROSS-REFERENCE TO RELATED APPLICATIONS

This application is a continuation of International Application No. PCT/FR2018/052852, filed on Nov. 15, 2018, which claims priority to and the benefit of FR 17/60823 filed on Nov. 16, 2017. The disclosures of the above applications are incorporated herein by reference.

FIELD

The present disclosure relates to the field of aircraft propulsion units, in particular aircraft propulsion units comprising a nacelle and an engine of the bypass turbojet engine type. More specifically, the present disclosure concerns a thrust reverser with movable cascades for such propulsion units as well as dismounting and mounting or remounting methods allowing to carry out maintenance operations on the removed engine.

BACKGROUND

The statements in this section merely provide background information related to the present disclosure and may not include prior art.

A thrust reverser with cascades allows to pass the propulsion unit from a cruise configuration, called "direct jet," to a thrust reverser configuration, called "reverse jet." In the reverse jet configuration, a portion of the air flow is redirected upstream of the propulsion unit through cascades also called "cascades vane" in this document.

In a thrust reverser with movable cascades, the passage from the direct jet configuration to the reverse jet configuration is carried out by simultaneous translation of the movable cowl of the thrust reverser and the cascades vane. Document FR 2 999 239 A1 shows an aircraft propulsion unit provided with a thrust reverser with movable cascades.

In the state of the prior art, it is known to translate the cascades vane via rails secured to the engine. These cascade rails form a sliding connection with respective slides secured to the cascades vane. In order to ensure a good take-up of the mechanical forces generated by the translation of the cascades vane, it is known to dispose the rails:

in the so-called "12 o'clock" position, on either side of the engine pylon connecting the nacelle to the wing of the aircraft, and radially between the inner wall and the outer wall of the movable cowl of the thrust reverser.

To allow or facilitate maintenance operations on the engine, the movable cowl is typically produced in the form of two half-cowls articulated on the engine pylon of the nacelle by hinges. The movable cowl can thus be placed in a maintenance position by pivoting the half-cowls relative to the engine pylon so as to open the half-cowls.

Certain maintenance operations require extracting the engine from the nacelle. The extraction is generally carried out by vertical translation of the engine and of elements secured to the engine, in particular the cascades vane and the cascade rails. This translation takes place downwards relative to the engine pylon located upwards. The cascade rails being disposed radially between the inner wall and the outer wall of the movable cowl of the thrust reverser, such an extraction makes the cascade rails collide with the movable cowl which can damage these different elements.

SUMMARY

This section provides a general summary of the disclosure and is not a comprehensive disclosure of its full scope or all of its features.

The present disclosure provides a thrust reverser, an aircraft propulsion unit as well as dismounting and mounting or remounting methods as described below.

According to one aspect, the present disclosure concerns a thrust reverser for a propulsion unit of an engine aircraft. This thrust reverser comprises two beams each comprising a beam rail and hinges. The reverser also comprises two half-cowls, each half-cowl connected to a corresponding beam rail in a sliding connection authorizing a translation of the half-cowls, relative to the beams, between a cruise position and a thrust reversal position. The beams are arranged to be connected by their respective hinges to an engine pylon of the propulsion unit according to a pivot connection authorizing a rotation of the beam rails and corresponding half-cowls between a closed position and a maintenance position in which the half-cowls are open. The reverser also comprises cascades vane and cascade rails. The cascades vane are connected to the cascade rails in a sliding connection allowing a translation of the cascades vane between a cruise position and a thrust reversal position, the cruise position and the thrust reversal position of the cascades vane being defined relative to the beams. The reverser also comprises removable fixing means arranged to removably connect at least one of the cascade rails to the engine by embedding.

The term "removable" means (or devices) which can be withdrawn, and in particular which can be withdrawn without deterioration. Removable fixing means/devices are therefore fixing means/devices which can be withdrawn and then reused, in this case to connect at least one of the cascade rails to the engine.

The term "embedding" means a complete mechanical connection inhibiting relative movement of the parts thus connected. Thus, fixing means connecting one or more cascade rails to the engine by embedding inhibits relative movement of the cascade rail(s) relative to the engine.

Such a reverser facilitates maintenance operations on the engine involving its removal from the aircraft thanks to the removability of the fixing means. The latter can in fact be withdrawn for positioning the cascade rails so as to avoid their collision with the half-cowls during the simultaneous extraction of the engine and the cascades vane and, where appropriate, of the cascade rails. During remounting, these fixing means can be reused.

In one form, the thrust reverser may comprise two cascade rails arranged to be positioned, when the reverser is assembled with the propulsion unit, on either side of the engine pylon. In this form, the fixing means can be arranged to removably connect one or both of the cascade rails to the engine by embedding.

The connection of one or more cascade rails to the engine can be achieved by embedding on a fan casing of the propulsion unit.

In one form, the thrust reverser is arranged so that, when the fixing means are withdrawn, said slide connection connecting the cascades vane and the cascade rails authorizes a translation of the cascade rails, relative to the cascades vane and the beams, between a fixing position and an advanced position. When the cascade rails are in the fixing position, the cascade rails can be connected to the engine by the fixing means.

In this form, the thrust reverser may further comprise one or more keying devices connected to a respective cascade rail and arranged to interfere with a component of the propulsion unit so as to inhibit the assembly of this component with the propulsion unit when at least one of the cascade rails is in the advanced position. Said component of the propulsion unit may be a fairing of the engine pylon or of the fan casing.

Such a keying device allows inhibiting assembly of said component if the cascade rails are not correctly positioned, providing proper positioning of the cascade rails before finalizing the maintenance operation.

In one form, the thrust reverser may comprise at least one connecting rod arranged to connect the cascade rails together so as to take up mechanical forces exerted on the cascade rails by the cascades vane in a normal direction, or substantially normal to the cascade rails, in particular when the cascades vane are in the thrust reversal position.

In this form, the thrust reverser includes removable means for fixing a connecting rod arranged to connect the connecting rod to the cascade rails.

The at least one connecting rod can include with each cascade rail to which it is connected a ball-joint connection.

Alternatively, it can be connected to the cascade rails by embedding.

More generally, the at least one connecting rod can include, with each cascade rail to which it is connected, a mechanical connection provided with a selected number of degrees of freedom.

Thus, in one form, the means for fixing the connecting rod are ball-joint connection means.

In another form, the means for fixing the connecting rod are connection means by embedding.

More generally, the means for fixing the connecting rod are mechanical connection means provided with a selected number of degrees of freedom.

The present disclosure also concerns an aircraft propulsion unit comprising a thrust reverser as described in this document.

According to another aspect, the present disclosure concerns a method for dismounting such an aircraft propulsion unit in order to carry out a maintenance operation on the engine involving its removal from the aircraft.

This dismounting method comprises:

an arrangement of the half-cowls in the maintenance position;

a withdrawal of the fixing means so that the cascade rails are movable relative to the engine;

a translation of the cascade rails relative to the cascades vane so as to place the cascade rails in an advanced position allowing an extraction of a sub-assembly without collision of the cascade rails with the half-cowls, said sub-assembly including the engine, the cascade rails and the cascades vane, the advanced position of the cascade rails being defined relative to the engine and the cascades vane; and an extraction of said sub-assembly by vertical translation thereof relative to the half-cowls.

In forms in which the thrust reverser comprises a connecting rod connecting the cascade rails to each other at one end of the cascade rails receiving the cascades vane in the thrust reversal position, the method may comprise, before the withdrawal of said fixing means, the dismounting of this connecting rod.

Such a method allows extracting the engine, the cascades vane and the cascade rails without causing the cascade rails to collide with the half-cowls.

In one form, the dismounting method may comprise, before the step of extracting said sub-assembly, a fixing of the cascades vane and/or cascade rails on a component secured to the engine. For example, this component can be the fan casing.

Such a fixing step allows maintaining the cascades vane and/or the cascade rails secured to the engine during its extraction and its transport.

For example, the fixing step may include fixing the cascades vane on said component secured to the engine before the translation step of the cascade rails. Such securing of the cascades vane and the engine can facilitate the translation step of the cascade rails relative to the cascades vane.

In one form, after fixing the cascades vane on said component secured to the engine and then translating the cascade rails, it is possible to fix the translated cascade rails, in one example in the advanced position, to said component secured to the engine or to another component secured to the engine or to the cascades vane. Such fixing of the cascade rails can facilitate the extraction, transport and storage of the sub-assembly comprising the engine, the cascade rails and the cascades vane. Alternatively, after fixing the cascades vane on said component secured to the engine and then translation of the cascade rails, the cascade rails can be withdrawn from the cascades vane. In this case, during the step of translating the cascade rails, these are translated relative to the cascades vane until separation from the cascades vane.

The present disclosure also concerns a method for mounting or remounting an aircraft propulsion unit.

This mounting or remounting method comprises:

an arrangement of the half-cowls in the maintenance position;

a positioning of the cascade rails relative to the cascades vane in an advanced position allowing insertion of a sub-assembly without collision of the cascade rails with the half-cowls, said sub-assembly including the engine, the cascade rails and the cascades vane, the advanced position of the cascade rails being defined relative to the engine and the cascades vane;

an insertion of said sub-assembly by vertical translation thereof relative to the half-cowls;

a translation of the cascade rails relative to the cascades vane so as to place the cascade rails in a fixing position in which the cascade rails can be connected to the engine by said fixing means, the fixing position of the cascade rails being defined relative to the engine and the cascades vane; and an assembly of the fixing means so as to connect at least one of the cascade rails to the engine by embedding.

In forms in which the thrust reverser comprises a connecting rod connecting the cascade rails to each other at one end of the cascade rails receiving the cascades vane in the thrust reversal position, the mounting or remounting method may comprise, after assembling said fixing means, the mounting of this connecting rod.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to the field of aircraft propulsion units.

Figure 1:
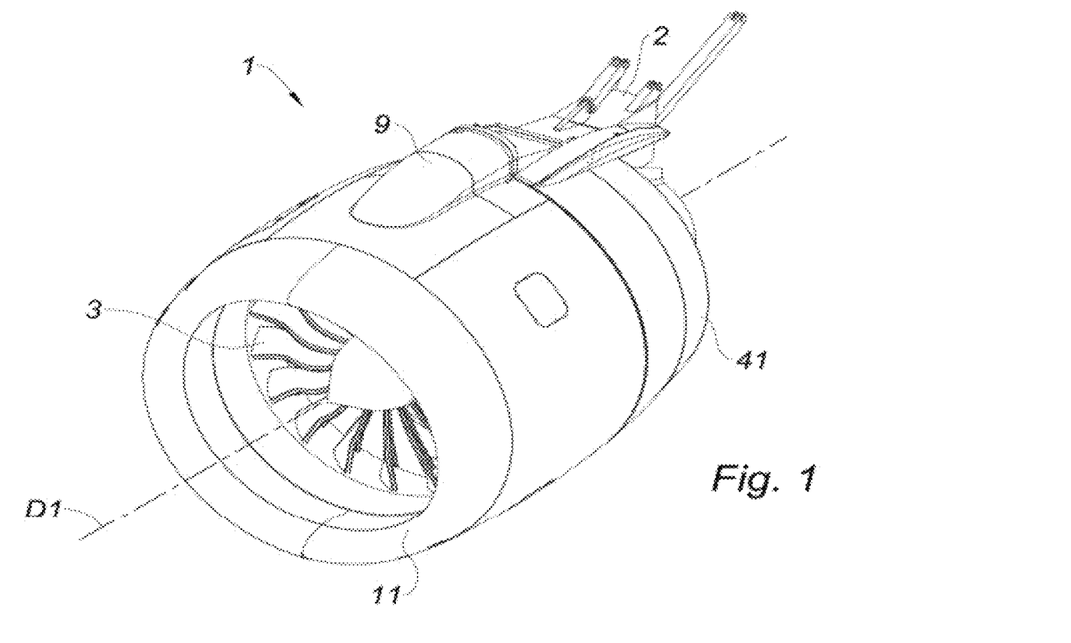
FIG. 1 is a schematic perspective view of a propulsion unit according to the present disclosure, with a thrust reverser with movable cascades in the cruise position.

An aircraft propulsion unit is illustrated in FIG. 1. This propulsion unit comprises a nacelle 1, an engine pylon 2 and an engine of the turbojet engine type (not represented) housed in nacelle 1. The engine pylon 2, partially represented, is intended to be fixed to a wing (not represented) of the aircraft.

The nacelle 1 comprises an air inlet 11 adapted to allow enhanced capture towards the turbojet engine of the air necessary for the supply of a fan 3 and of inner compressors (not represented) of the turbojet engine.

In what follows, the engine may be a turbojet engine of such a propulsion unit.

The nacelle 1 extends in a direction D1 passing through the axis of the engine.

Figure 5:
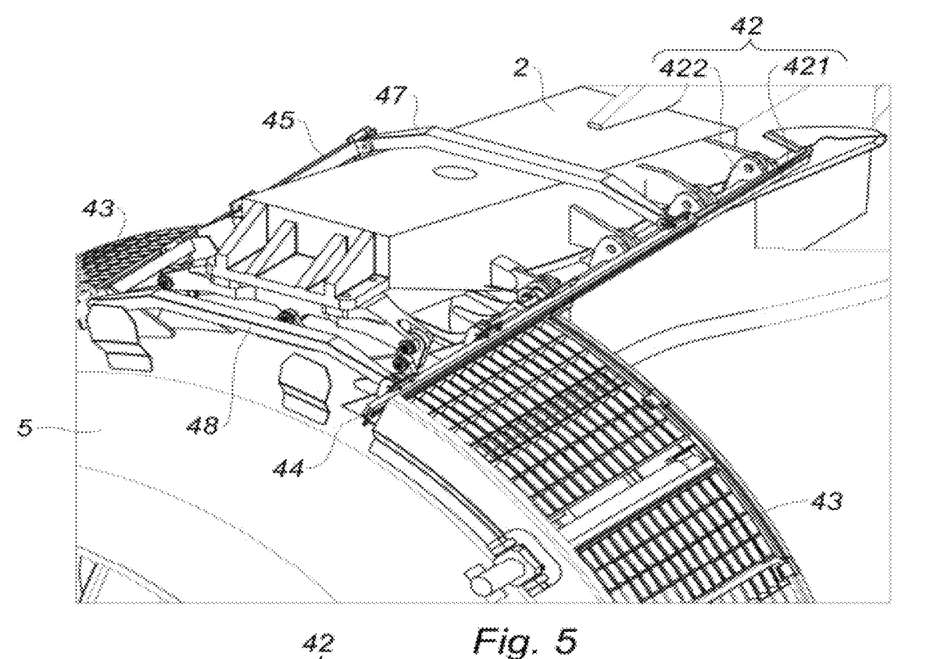
FIG. 5 is a schematic perspective view of a portion of the propulsion unit of FIG. 1, showing the cascades vane of the thrust reverser in the cruise position.
Figure 6:
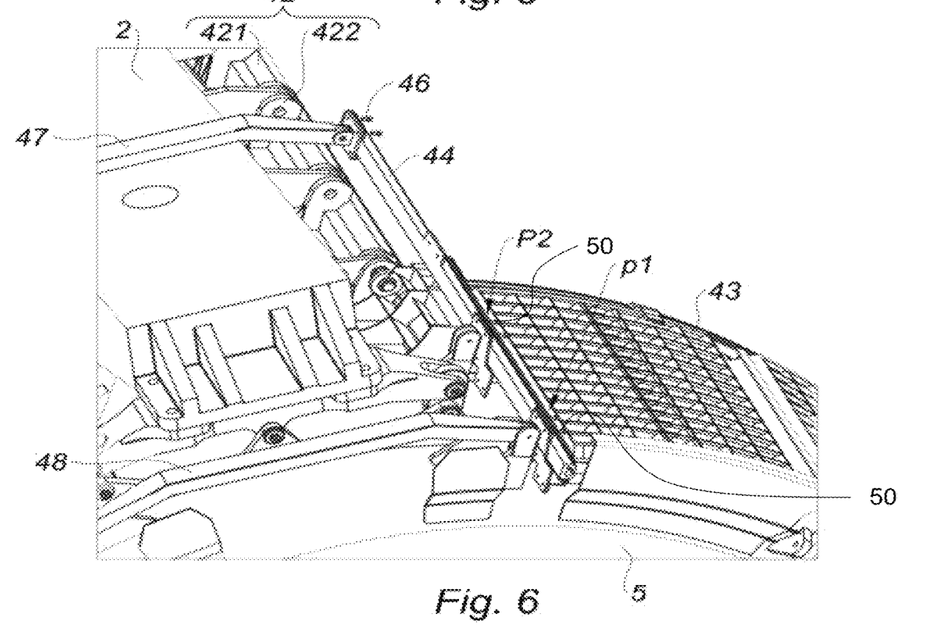
FIG. 6 is a schematic perspective view of a portion of the propulsion unit of FIG. 1, showing the cascades vane of the thrust reverser in the cruise position.
Figure 7:
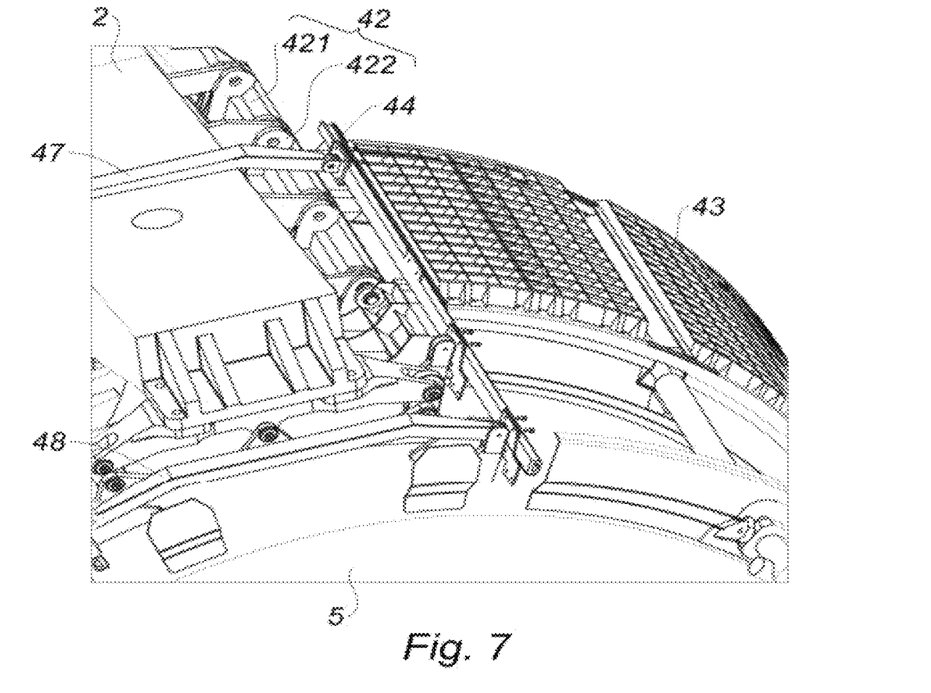
FIG. 7 is a schematic perspective view of a portion of the propulsion unit of FIG. 1, showing the cascades vane in the thrust reversal position.

With reference to FIGS. 1 to 7, the nacelle 1 includes a thrust reverser comprising:

a movable cowl including two half-cowls: a single half-cowl 41 is illustrated in FIGS. 1 to 4;

two beams: a single beam 42 is illustrated in FIGS. 5 to 7;

cascades vane 43; and cascade rails 44 and 45. In this example, the cascade rails 44 and 45 are located on either side of the engine pylon 2 when the thrust reverser is assembled in the propulsion unit.

Each beam 42 comprises a beam rail 421 and hinges 422.

Figure 2:
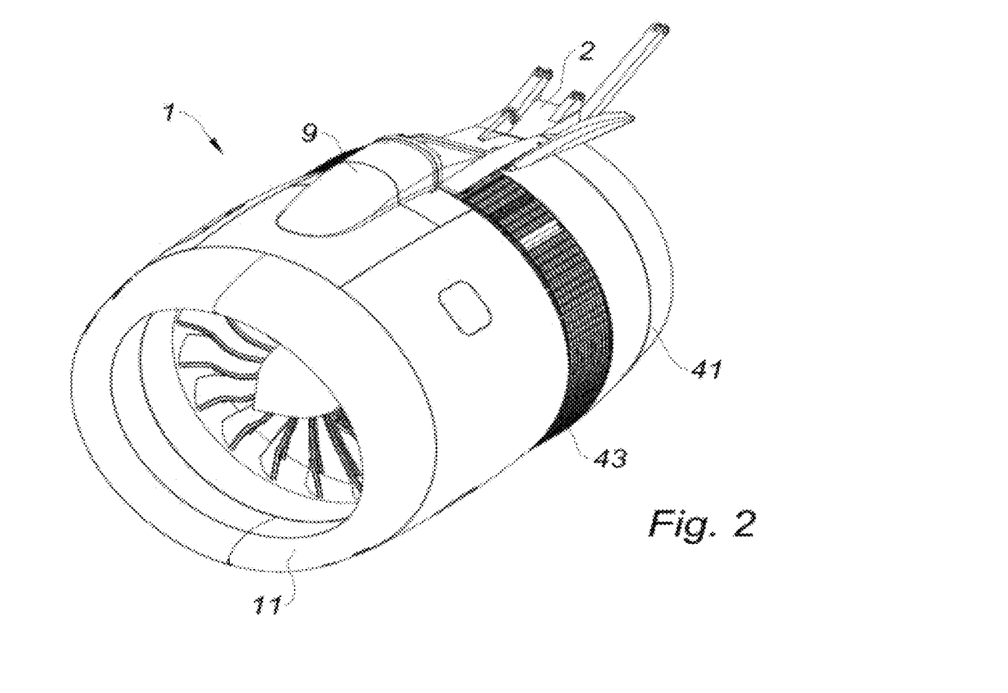
FIG. 2 is a schematic perspective view of the propulsion unit of FIG. 1, with thrust reverser in the thrust reversal position.

The half-cowls 41 are respectively connected to a corresponding beam rail 421 of the two beams 42 in a sliding connection authorizing a translation of the half-cowls 41, relative to the beams 42, between a cruise position and a thrust reversal position. The cruise position of the half-cowls 41 is illustrated in FIG. 1. The thrust reversal position of the half-cowls 41 is illustrated in FIG. 2.

Figure 3:
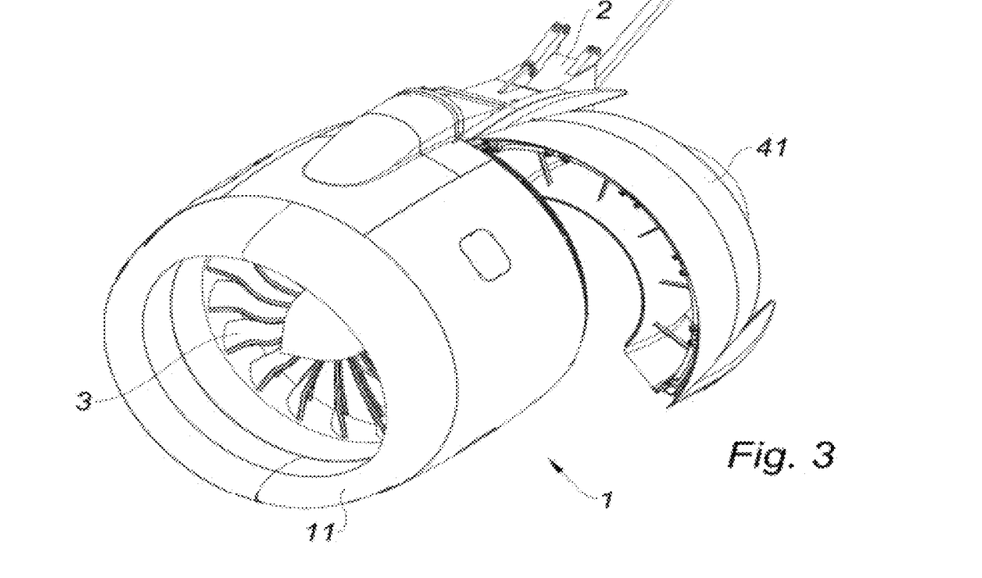
FIG. 3 is a schematic perspective view of the propulsion unit of FIG. 1, with a movable cowl in the maintenance position and fairing of the removed engine pylon.

The beams 42 are arranged to be connected by their respective hinges 422 to the engine pylon 2 according to a pivot connection. In this example, this pivot connection has an axis parallel or substantially parallel to the direction D1. This pivot connection is arranged to authorize a rotation of the beam rails 421 and corresponding half-cowls 41 between a closed position and a maintenance position in which the half-cowls are open. The closed position of the half-cowls 41 is illustrated in FIG. 1. The maintenance position of the half-cowls 41 is illustrated in FIGS. 3 and 4.

With reference to FIGS. 5 to 7, the cascades vane 43 are connected to the cascade rails 44 and 45 in a sliding connection authorizing a translation of the cascades vane 43 between a cruise position and a thrust reversal position.

The cruise position and the thrust reversal position of the cascades vane 43 are defined relative to the beams 42, these beams 42 being secured to the engine pylon 2 in translation in the direction D1.

Figure 4:
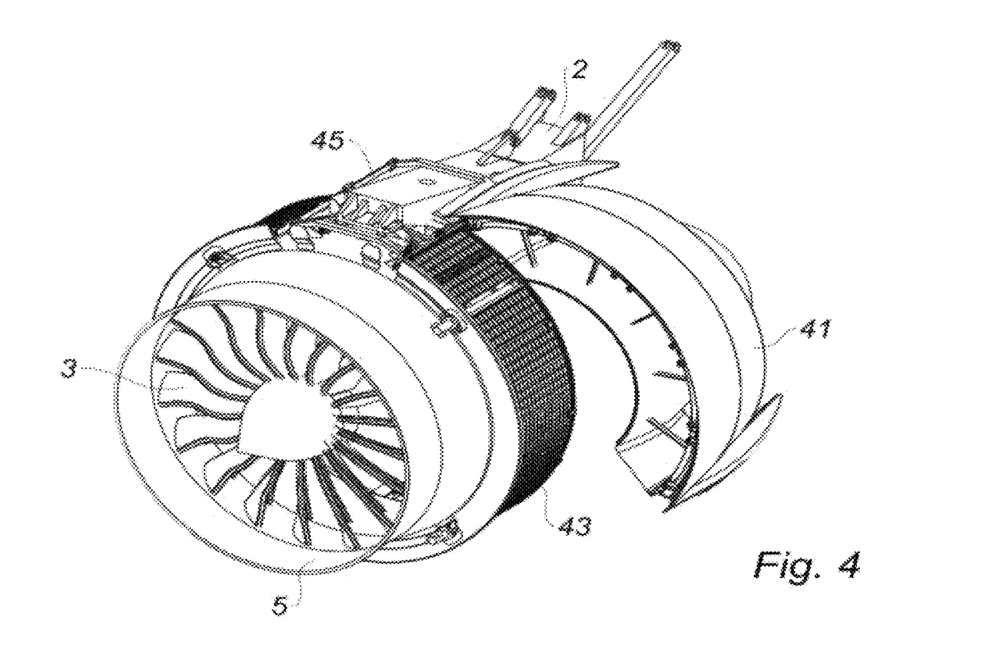
FIG. 4 is a schematic perspective view of the propulsion unit of FIG. 1, with the movable cowl in the maintenance position and several removed fairing elements.

The cruise position of the cascades vane 43 is illustrated in FIGS. 4 to 6. The thrust reversal position of the cascades vane 43 is illustrated in FIG. 2 and in FIG. 7.

The thrust reverser also comprises removable fixing devices 46 and 50 which may comprise systems of the screw-nut type, for example with self-locking nut.

The fixing device targeted by the reference 46 in FIG. 6 is used to connect the connecting rod 47 to the cascades rail 44 (see hereinbelow) and are also referred to as "means for fixing the connecting rod."

The thrust reverser comprises a fixing device 50 arranged to removably connect at least one of the cascade rails 44 and 45 to the engine by embedding. The fixing device 50 is arranged to removably connect at least one of the cascade rails 44 and 45 to the engine are similar to the device for fixing the connecting rod 48 targeted by the reference 46 in FIG. 6.

In this example, the fixing device 50 is arranged to connect the cascades rail 44 to the engine, on the one hand in a central portion P2 of this rail 44, and on the other hand at an end P1 of this rail 44 (FIG. 6). Similarly, the fixing device 50 is arranged to connect the cascades rail 45 to the engine both at a central portion of the rail 45 and at an end of this rail 45.

Thus, in the example of FIGS. 5 and 6, the fixing device 50 removably connects the two cascade rails 44 and 45 to the engine by embedding.

The connection of one or more cascade rails to the engine can be achieved by embedding on a fan casing 5 of the propulsion unit. FIGS. 5 to 7 illustrate a connection by embedding to the fan casing 5 both of the rails 44 and at one of their ends P1 (located at the connecting rod 48) and at their central portion P2 (see FIG. 6).

In this example, the thrust reverser comprises two connecting rods 47 and 48 arranged to connect the cascade rails 44 and 45 together so as to take up the mechanical forces exerted on these rails by the cascades vane 43, in particular the forces exerted in a direction normal, or substantially normal, to the cascade rails 44 and 45, this direction being perpendicular or substantially perpendicular to the direction D1.

In this example, each of the connecting rods 47 and 48 is connected to the cascade rails 44 and 45 by embedding using the fixing device 46 for fixing the connecting rod 48.

The connecting rod 47 connects a first end of the cascade rails 44 and 45, this first end receiving the cascades vane 43 when the latter are in thrust reversal position. The connecting rod 48 connects a second end of the cascade rails 44 and 45, this second end receiving the cascades vane 43 when these are in the cruise position.

The connection between each connecting rod and each cascade rail may comprise one or more degrees of freedom in order to facilitate mounting and/or avoid the drawbacks of a hyperstatic assembly. In non-limiting exemplary forms:

the connection between the connecting rod 48 and the cascade rails 44 and 45 can be a ball-joint connection (not represented), or the connecting rod 47 can be connected to the rails 44 and 45 in a ball-joint connection and the connecting rod 48 to the rails 44 and 45 by embedding.

In one form, a holding rod can connect the fan casing 5 to the cascade rails 44 and 45 substantially in their middle (at the level of the reference P2 in FIG. 6), this holding rod being able to extend in a direction substantially normal to the surface of the fan casing 5.

The present disclosure proposes a method for dismounting such an aircraft propulsion unit for carrying out a maintenance operation on the engine involving its removal from the aircraft.

According to this method, the half-cowls 41 are disposed or arranged in the maintenance position (FIG. 3).

The fixing device 46 for fixing the connecting rod 48 is then withdrawn to withdraw the connecting rod 47.

The fixing device 50 is arranged to removably connect the cascade rails 44 and 45 to the engine are then withdrawn, so that the cascade rails 44 and 45 are movable relative to the engine.

Figure 8:
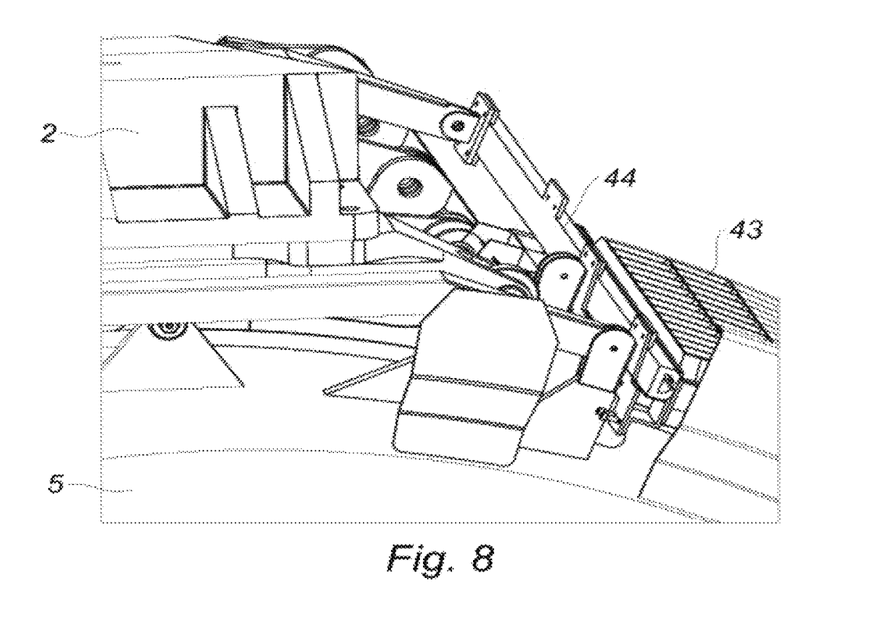
FIG. 8 is a schematic perspective view of a portion of the propulsion unit of FIG. 1, showing a position for fixing the cascade rails.
Figure 9:
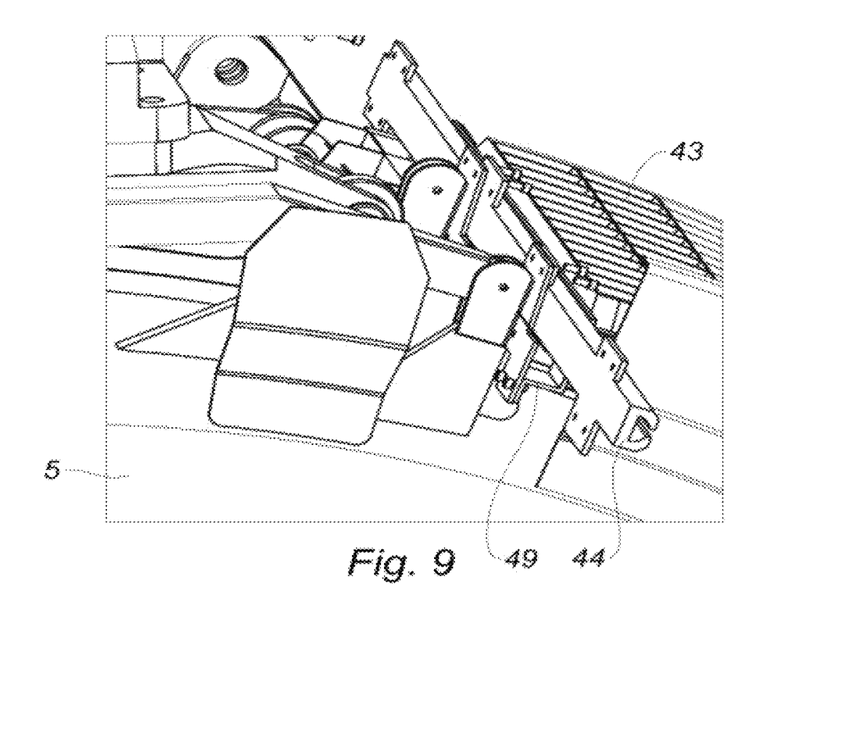
FIG. 9 is a schematic perspective view of a portion of the propulsion unit of FIG. 1, showing the cascade rails in an advanced position.
Figure 10:
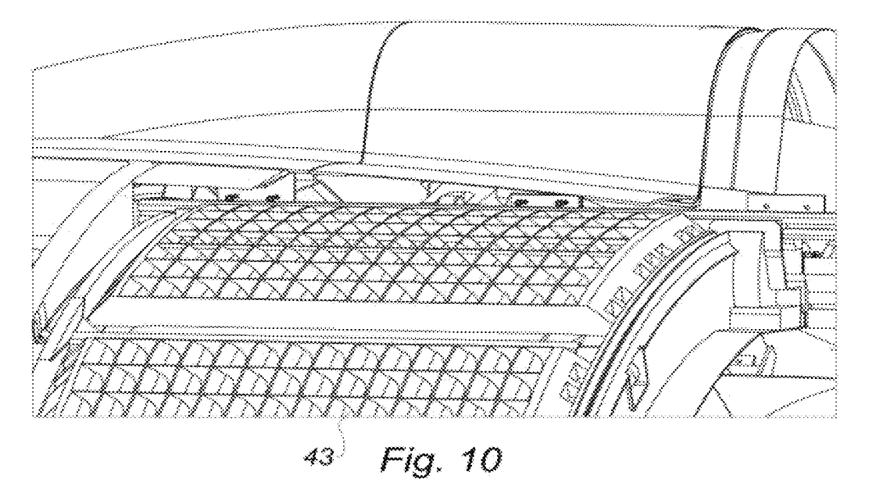
FIG. 10 is a schematic perspective view of a portion of the propulsion unit of FIG. 1, showing a position for fixing the cascade rails.
Figure 11:
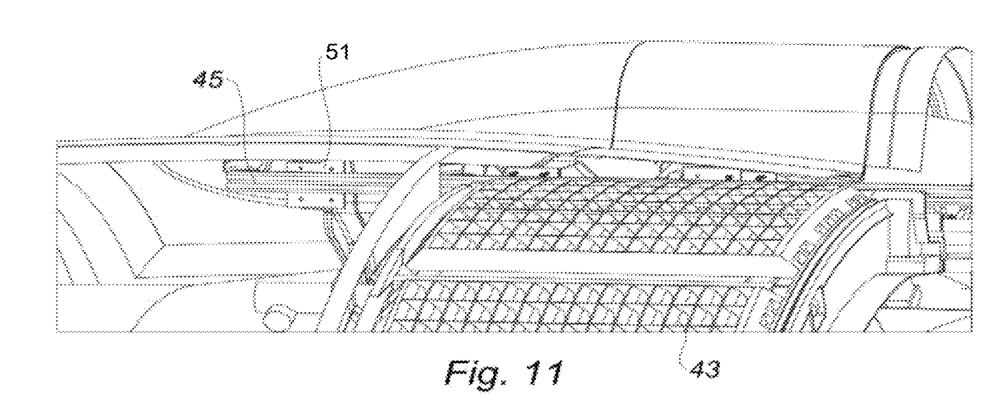
FIG. 11 is a schematic perspective view of a portion of the propulsion unit of FIG. 1, showing the cascade rails in an advanced position.

A next step includes translating the cascade rails 44 and 45 relative to the cascades vane 43 so as to place the rails 44 and 45 in an advanced position. The advanced position of the cascade rails 44 and 45 is defined relative to the engine and the cascades vane 43. The initial position of the cascades rail 44, that is to say before this translation step is carried out, is illustrated in FIG. 8 (FIG. 10 also represents the propulsion unit with the cascade rails in the initial position). The advanced position of the cascade rails 44 and 45, that is to say after this translation step has been carried out, is illustrated in FIGS. 9 and 11.

This translating step and in particular the positioning of the cascade rails 44 and 45 in the advanced position allows an extraction of the engine, the cascade rails 44 and 45 and cascades vane 43 without collision of the rails 44 and 45 with the half-cowls 41.

When the cascade rails 44 and 45 are in the advanced position, it is then possible to extract a sub-assembly comprising the engine, the cascade rails 44 and 45 and the cascades vane 43.

This extraction is carried out by vertical translation, or comprising a vertical component, of the sub-assembly relative to the half-cowls 41.

Figure 12:
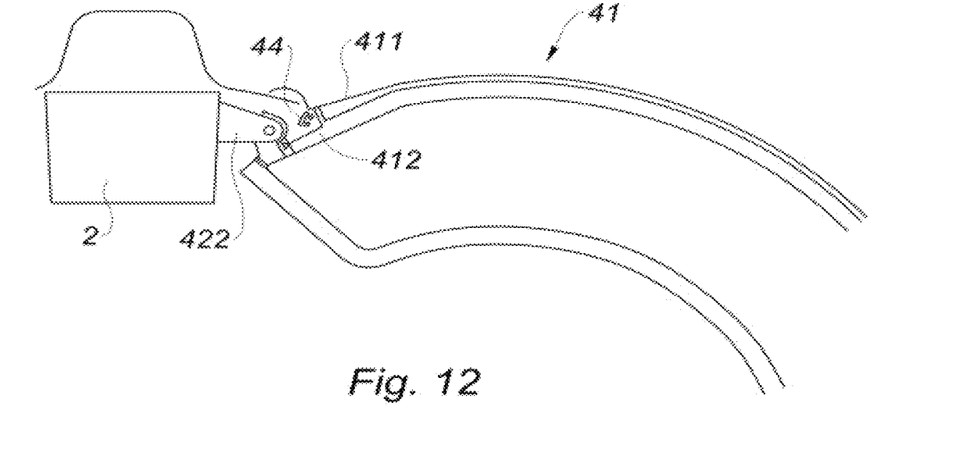
FIG. 12 is a schematic front view of the propulsion unit of FIG. 1, with a movable cowl in the maintenance position.
Figure 13:
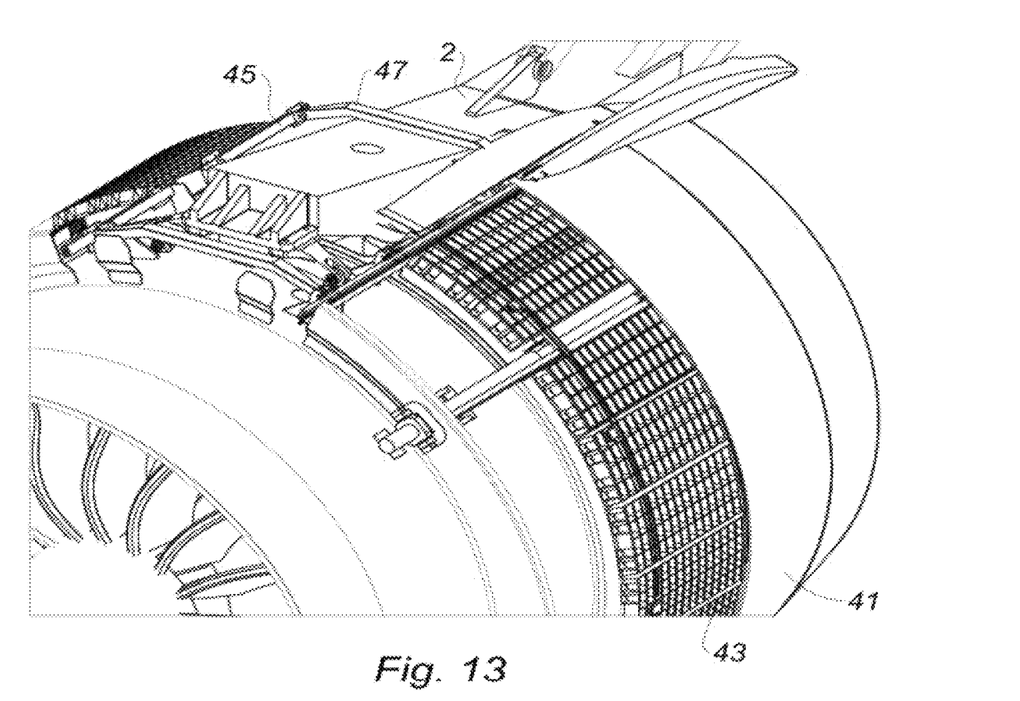
FIG. 13 is a schematic perspective view of portions of the propulsion unit of FIG. 1, showing the cascade rails in the fixing position.

The advanced position of the cascade rails 44 and 45 allows extracting said sub-assembly without causing the cascade rails 44 and 45 to collide with the half-cowls 41. In fact, as is apparent from FIG. 12, when the thrust reverser is assembled with the propulsion unit, the cascade rails 44 and 45 are located radially between an outer wall 411 and an inner wall 412 of the half-cowls 41. Without positioning the cascade rails 44 and 45 in the advanced position, these would collide with the inner wall 412 of the half-cowls 41 during the extracting step.

Optionally, before the step of extracting said sub-assembly, the cascades vane 43 and/or the cascade rails 44 and 45 can be fixed on a component secured to the engine. For example, this component can be the fan casing 5 of the propulsion unit.

For example, to fix the cascades vane 43 to the fan casing 5, brackets 49 such as that illustrated in FIG. 9 can be used.

The remounting of the engine and more generally of the sub-assembly with the propulsion unit can follow the reverse steps.

For example, if the half-cowls 41 are not or no longer in the maintenance position, these are disposed in this maintenance position.

Similarly, if the cascade rails 44 and 45 are not or no longer in the advanced position, they are positioned in this advanced position so as to allow insertion of said sub-assembly without collision of the cascade rails 44 and 45 with the half-cowls 41.

The sub-assembly can then be inserted by vertical translation, or comprising a vertical component, of the latter relative to the half-cowls 41.

Where appropriate, the fixings of the cascades vane 43 and/or of the cascade rails 44 and 45 connecting the latter on said component secured to the engine are taken off.

The cascade rails 44 and 45 are then translated relative to the cascades vane 43 so as to place the cascade rails in a fixing position in which they can be connected to the engine by the fixing device 50 arranged to removably connect the cascade rails 44 and 45 to the engine. The fixing position of the cascade rails 44 and 45 is defined relative to the engine and the cascades vane 43.

Said fixing device 50 can then be assembled so as to connect the cascade rails 44 and 45 to the engine.

The connecting rod 47 can then be mounted using the connecting rod fixing device 46.

It appears from the preceding description that the thrust reverser is arranged so that when the fixing device 46 for fixing the connecting rod 48 and the fixing device 50 are arranged to removably connect the cascade rails 44 and 45 to the engine are withdrawn, said sliding connection connecting the cascades vane 43 and the cascade rails 44 and 45 authorizes a translation of the cascade rails 44 and 45, relative to the cascades vane 43 and the beams 42, between a fixing position and an advanced position.

When the cascade rails 44 and 45 are in the fixing position (FIG. 8), the cascade rails 44 and 45 can be connected to the engine by the fixing device 50 arranged to removably connect the cascade rails 44 and 45 to the engine.

In order to determine that the operator has correctly positioned the cascade rails 44 and 45, the thrust reverser may comprise at least one keying device 51 (see FIG. 11) connected to a respective cascades rail and arranged to interfere with a component 9 of the propulsion unit so as to inhibit the assembly of this component 9 with the propulsion unit when at least one of the of cascade rails 44 and/or 45 is in the advanced position. Said component 9 of the propulsion unit can be a fairing of the engine pylon (see FIG. 1) or of the fan casing 5.

Of course, the present disclosure is not limited to the examples which have just been described and numerous modifications can be made to these examples without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a propulsion unit of an engine aircraft, the thrust reverser comprising:
    two beams, each of the beams comprising a beam rail and hinges;
    two half-cowls, each of the half-cowls connected to a corresponding beam rail of the two beams in a sliding connection authorizing a translation of the two half-cowls, relative to the two beams, between a cruise position and a thrust reversal position, the two beams being arranged to be connected by the hinges of each beam to an engine pylon of the propulsion unit according to a pivot connection authorizing a rotation of the beam rail of each beam and the corresponding half-cowl between a closed position and a maintenance position in which the two half-cowls are open;
    cascades vane and cascade rails, the cascades vane being connected to the cascade rails in a sliding connection allowing a translation of the cascades vane between a cruise position and a thrust reversal position, the cruise position and the thrust reversal position of the cascades vane being defined relative to the two beams; and
    a first fixing device arranged to removably connect at least one of the cascade rails to an engine by embedding;
    wherein when the first fixing device is withdrawn, the sliding connection connecting the cascades vane and the cascade rails authorizes a translation of the cascade rails, relative to the cascades vane and the two beams, between a fixing position and an advanced position, the cascade rails being connected to the engine by the first fixing device when the cascade rails are in the fixing position.

2. The thrust reverser according to claim 1 further comprising at least one keying device connected to a respective cascade rail of the cascade rails and arranged to interfere with a component of the propulsion unit so as to inhibit assembly of the component with the propulsion unit when at least one of the cascade rails is in the advanced position.

3. The thrust reverser according to claim 1 further comprising at least one connecting rod arranged to connect the cascade rails together so as to take up mechanical forces exerted on the cascade rails by the cascades vane in a direction normal to the cascade rails, and a second fixing device arranged to connect the at least one connecting rod to the cascade rails.

4. The thrust reverser according to claim 3, wherein the second fixing device arranged to connect the at least one connecting rod to the cascade rails is a ball-joint connection.

5. An aircraft propulsion unit comprising a thrust reverser according to claim 1.

6. A method for dismounting an aircraft propulsion unit according to claim 5 for carrying out a maintenance operation on the engine involving removal of the engine from an aircraft, the method comprising:
    arranging the two half-cowls in the maintenance position;
    withdrawing the fixing device so that the cascade rails are movable relative to the engine;
    translating the cascade rails relative to the cascades vane so as to place the cascade rails in the advanced position allowing an extraction of a sub-assembly without collision of the cascade rails with the two half-cowls, the sub-assembly including the engine, the cascade rails and the cascades vane, the advanced position of the cascade rails being defined relative to the engine and the cascades vane; and
    extracting the sub-assembly by vertical translation thereof relative to the two half-cowls.

7. The method according to claim 6 further comprising fixing at least one of the cascades vane and the cascade rails on a component secured to the engine before extracting the sub-assembly.

8. A method for mounting or remounting an aircraft propulsion unit according to claim 5 comprising:
    arranging the two half-cowls in the maintenance position;
    positioning the cascade rails relative to the cascades vane in the advanced position allowing an insertion of a sub-assembly, the sub-assembly including the engine, the cascade rails and the cascades vane, the advanced position of the cascade rails being defined relative to the engine and the cascades vane;
    inserting the sub-assembly by vertical translation thereof relative to the two half-cowls;
    translating the cascade rails relative to the cascades vane so as to place the cascade rails in the fixing position in which the cascade rails can be connected to the engine by the fixing device, the fixing position of the cascade rails being defined relative to the engine and the cascades vane; and
    assembling the fixing device so as to connect at least one of the cascade rails to the engine by embedding.

* * * * *